(12) United States Patent
Ho et al.

(10) Patent No.: US 10,289,548 B1
(45) Date of Patent: May 14, 2019

(54) METHOD AND SYSTEM FOR GARBAGE COLLECTION IN A STORAGE SYSTEM WHICH BALANCES WEAR-LEVELING AND PERFORMANCE

(71) Applicant: EMC IP Holding Company LLC, Hopkinton, MA (US)

(72) Inventors: Grace Ho, Sunnyvale, CA (US); Jeffrey S. Bonwick, Los Altos, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 71 days.

(21) Appl. No.: 15/581,368

(22) Filed: Apr. 28, 2017

(51) Int. Cl.
*G06F 12/02* (2006.01)

(52) U.S. Cl.
CPC .. *G06F 12/0261* (2013.01); *G06F 2212/1016* (2013.01); *G06F 2212/1036* (2013.01)

(58) Field of Classification Search
USPC .......................................................... 711/166
See application file for complete search history.

(56) References Cited

U.S. PATENT DOCUMENTS

| | | | | |
|---|---|---|---|---|
| 2009/0132778 A1* | 5/2009 | Danilak | ................ | G06F 11/008 711/167 |
| 2010/0174845 A1* | 7/2010 | Gorobets | ............ | G06F 12/0246 711/103 |
| 2012/0254519 A1* | 10/2012 | Ellis | ..................... | G06F 12/0246 711/103 |
| 2013/0132647 A1* | 5/2013 | Melik-Martirosian | ..................... | G06F 12/0246 711/103 |
| 2014/0089565 A1* | 3/2014 | Lee | ......................... | G06F 3/061 711/103 |
| 2014/0207997 A1* | 7/2014 | Peterson | ............. | G06F 12/0246 711/103 |
| 2014/0372674 A1* | 12/2014 | Kim | ..................... | G06F 12/0246 711/103 |
| 2015/0186072 A1* | 7/2015 | Darragh | ................ | G06F 3/0653 711/103 |
| 2015/0205667 A1* | 7/2015 | Bonwick | ............. | G06F 11/1076 714/6.24 |
| 2016/0062882 A1* | 3/2016 | Bonwick | ............... | G06F 3/0604 711/103 |
| 2016/0093397 A1* | 3/2016 | Tabrizi | ............... | G11C 16/3495 711/103 |
| 2016/0320986 A1* | 11/2016 | Bonwick | ............... | G06F 3/0619 |

\* cited by examiner

*Primary Examiner* — Mano Padmanabhan
*Assistant Examiner* — Jean C Edouard
(74) *Attorney, Agent, or Firm* — Chamberlain, Hrdlicka, White, Williams & Aughtry

(57) ABSTRACT

In general, embodiments of the technology relate to a method for managing data. The method includes, in response to initiating garbage collection on a storage appliance, selecting a first block from the plurality of blocks based, at least in part, on a selection frequency; and performing a garbage collection operation on the first block to generate a first erased block in the storage appliance.

9 Claims, 5 Drawing Sheets

METHOD AND SYSTEM FOR GARBAGE COLLECTION IN A STORAGE SYSTEM WHICH BALANCES WEAR-LEVELING AND PERFORMANCE

BACKGROUND

Storage systems include functionality to storage data in persistent storage and also to enable reading of data from the persistent storage. In order to manage data in a storage system, a garbage collector is typically used to reclaim memory from data that is no longer in use.

DETAILED DESCRIPTION

Specific embodiments of the technology will now be described in detail with reference to the accompanying figures. In the following detailed description of embodiments of the technology, numerous specific details are set forth in order to provide a more thorough understanding of the technology. However, it will be apparent to one of ordinary skill in the art that the technology may be practiced without these specific details. In other instances, well-known features have not been described in detail to avoid unnecessarily complicating the description In the following description of FIGS. 1-4C, any component described with regard to a figure, in various embodiments of the technology, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the technology, any description of the components of a figure is to be interpreted as an optional embodiment which may be implemented in addition to, in conjunction with, or in place of the embodiments described with regard to a corresponding like-named component in any other figure.

In general, embodiments of the technology, relate to a method and system for performing garbage collection operations in a storage system. More specifically, embodiments of the technology utilize a garbage collection operation that take into account both how much of a given block is currently being used to store data (i.e., data that is not invalid) and the current program/erase (P/E) cycle value of the block. In this manner, the garbage collection operation enables a more uniform wear-leveling across the solid state memory modules and, as a result, prevents (or limits) the occurrence of "hot spots" in the solid state memory modules.

Figure 1:
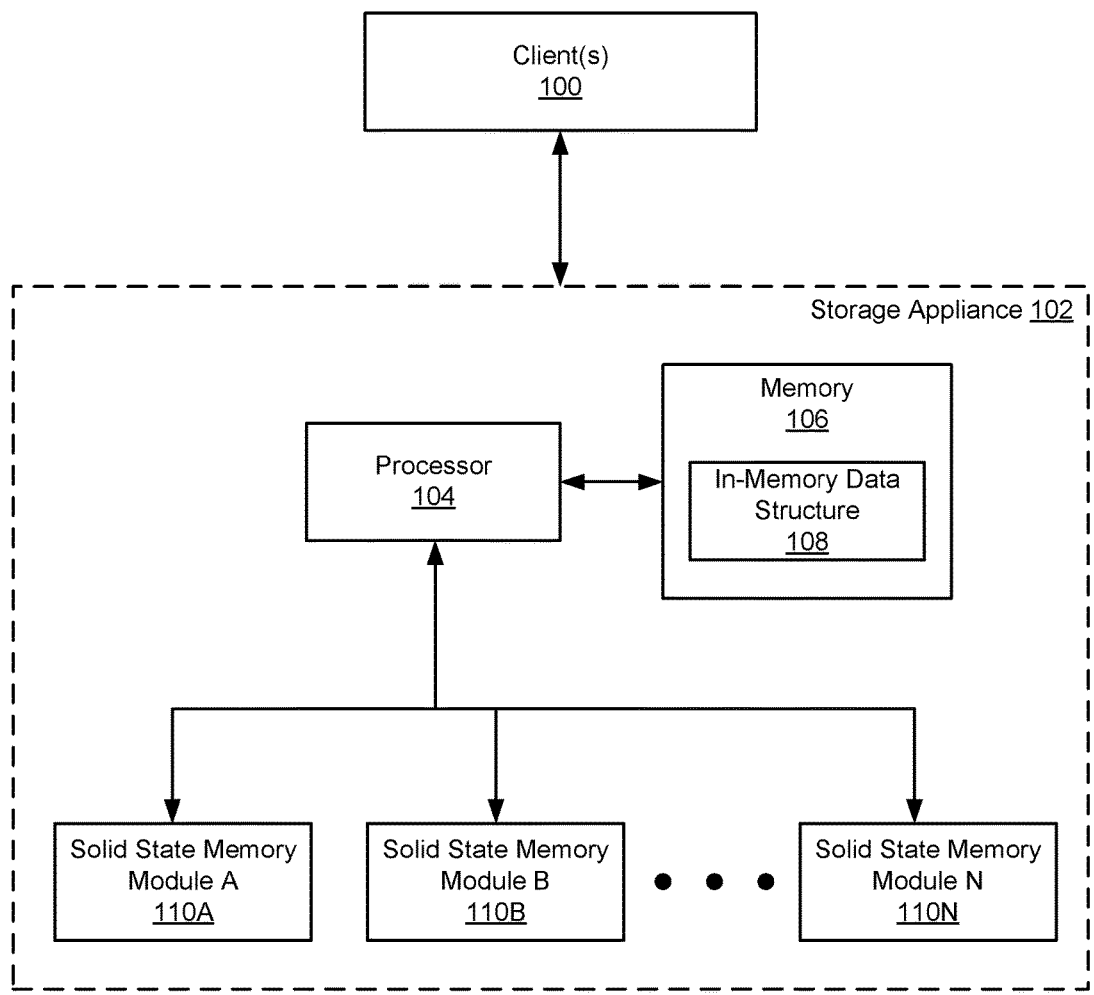
FIG. 1 shows a system in accordance with one or more embodiments of the technology.

FIG. 1 shows a system in accordance with one embodiment of the technology. As shown in FIG. 1, the system includes one or more clients (100) and a storage appliance (102). Each of these components is described below.

In one or more embodiments of the technology, a client (100) is any system or process executing on a system that includes functionality to issue a read request to the storage appliance (102) and/or issue a write request to the storage appliance. In one or more embodiments of the technology, the clients (100) may each include a processor (not shown), memory (not shown), and persistent storage (not shown).

In one or more embodiments of the technology, a client (100) is operatively connected to the storage appliance (102). In one or more embodiments of the technology, the storage appliance (102) is a system that includes volatile and persistent storage and is configured to service read requests and/or write requests from one or more clients (100). The storage appliance (102) is further configured to implement a garbage collection operation as described in FIG. 3. The storage appliance (102) is further configured to store data in response to write requests from the clients and/or to obtain data from the solid state memory modules in response to read requests from the clients.

In one or more embodiments of the technology, the storage appliance (102) includes a processor (104), memory (106), and one or more solid state memory modules (e.g., solid state memory module A (110A), solid state memory module B (110B), solid state memory module N (110N)).

In one or more embodiments of the technology, memory (106) may be any volatile memory including, but not limited to, Dynamic Random-Access Memory (DRAM), Synchronous DRAM, SDR SDRAM, and DDR SDRAM. In one or more embodiments of the technology, memory (106) is configured to temporarily store various data prior to such data being stored in a solid state memory module (e.g., 110A, 110B, 110N). Memory (106) is operatively connected to the processor (104).

In one or more embodiments of the technology, the processor (104) is a group of electronic circuits with a single core or multi-cores that are configured to execute instructions. The processor (104) is configured to execute instructions to implement one or more embodiments of the technology, where the instructions are stored on a non-transitory computer readable medium (not shown) that is located within or that is operatively connected to the storage appliance (102). Alternatively, the storage appliance (102) may be implemented using hardware. The storage appliance (102) may be implemented using any combination of software and/or hardware without departing from the technology.

In one or more embodiments of the technology, the storage appliance (102) is configured to create and update an in-memory data structure (108), where the in-memory data structure is stored in the memory (106). In one or more embodiments of the technology, the in-memory data structure includes mappings (direct or indirect) between logical addresses and physical addresses. In one or more embodiments of the technology, the logical address is an address at which the data appears to reside from the perspective of the client (100). In one or more embodiments of the technology, the logical address is (or includes) a hash value generated by applying a hash function (e.g., SHA-1, MD-5, etc.) to an n-tuple. In one or more embodiments of the technology, the n-tuple is <object ID, offset ID>, where the object ID defines an object (e.g. file) and the offset ID defines a location relative to the starting address of the object. In another embodiment of the technology, the n-tuple is <object ID, offset ID, birth time>, where the birth time corresponds to the time when the file (identified using the object ID) was created. Alternatively, the logical address may include a logical object ID and a logical byte address, or a logical object ID and a logical address offset. In another embodiment of the technology, the logical address includes an object ID and an offset ID. Those skilled in the art will appreciate that multiple logical addresses may be mapped to a single physical address and that the logical address is not limited to the above embodiments.

In one or more embodiments of the technology, the physical address may correspond to a location in the memory (106) or a location in a solid state memory module (e.g., 110A, 110B, 110N). In one or more embodiments of the technology, the in-memory data structure may map a single hash value to multiple physical addresses if there are multiple copies of the data in the storage appliance (102). Additional detail about the in-memory data structures is described with respect to FIG. 2.

In one or more embodiments of the technology, the solid state memory modules (e.g., 110A, 110B, 110N) correspond to any data storage device that uses solid-state memory to store persistent data. In one or more embodiments of the technology, solid-state memory may include, but is not limited to, NAND Flash memory, NOR Flash memory, Magnetic RAM Memory (M-RAM), Spin Torque Magnetic RAM Memory (ST-MRAM), Phase Change Memory (PCM), or any other memory defined as a non-volatile Storage Class Memory (SCM).

The following discussion describes embodiments of the technology implemented using solid-state memory devices. In such embodiments, each solid-state memory module may include one or more blocks. In one or more embodiments of the technology, a block is the smallest erasable unit of storage within the solid-state memory module. Further, each block may include one or more pages. In one or more embodiments of the technology, a page is the smallest addressable unit for read and program operations (including the initial writing to a page) in the solid-state memory module.

In one or more embodiments of the technology, rewriting a page within a block requires the entire block to be rewritten. A block has a limited number of program (e.g., write)/erase cycles, where a program/erase cycle includes writing one or more pages to the block then erasing the entire block. Pages in a block may be migrated, using a garbage collection operation, to another block to maintain a similar number of program/erase cycles across the blocks, referred to as "wear leveling".

Those skilled in the art will appreciate that the technology is not limited to the configuration shown in FIG. 1.

Turning to the flowcharts, while the various steps in the flowchart are presented and described sequentially, one of ordinary skill will appreciate that some or all of the steps may be executed in different orders, may be combined or omitted, and some or all of the steps may be executed in parallel.

Figure 2:
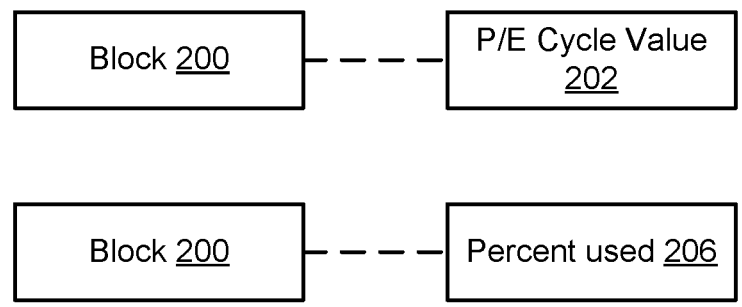
FIG. 2 shows relationships between components in accordance with one or more embodiments of the technology.

FIG. 2 shows the relationship between various components in accordance with one or more embodiments of the technology. More specifically, FIG. 2 shows the various types of information that are stored in the memory of the in-memory data structure (108). Further, the processor includes functionality to update the information stored in the memory. The information described below may be stored in one or more in-memory data structures. Further, any data structure type (e.g., arrays, linked lists, hash tables, etc.) may be used to organize the following information within the in-memory data structure(s) provided that the data structure type(s) maintains the relationships (as described below) between the information.

As discussed above, the memory includes a mapping of logical addresses (not shown) to physical addresses. In one embodiment of the technology, each block (200) is associated with a set of physical addresses and is also associated with a program/erase (P/E) cycle value (202). The P/E cycle value may represent: (i) the number of P/E cycles that have been performed on the physical locations defined by the physical addresses associated with the block or (ii) a P/E cycle range (e.g., 5,000-9,999 P/E cycles), where the number of P/E cycles that have been performed on the physical locations defined by the physical addresses associated with the block is within the P/E cycle range. In one embodiment of the technology, a P/E cycle is the writing of data to one or more pages in an erase block (i.e., the smallest addressable unit for erase operations, typically, a set of multiple pages) and the erasure of that block, in either order.

While FIG. 2 shows the P/E cycle value being stored on a per-block basis, the P/E cycle values may be stored on a per page basis, on a per set of blocks basis, and/or at any other level of granularity. The processor includes functionality to update, as appropriate, the P/E cycle values (402) when data is written to (and/or erased from) the solid-state storage modules.

Continuing with the discussion of FIG. 2, the amount of the block that includes valid data (referred to as percent used (206) is also tracked in the in-memory data structure. When the block only includes valid data, then the block is deemed to be 100% used. However, as various pages in the block become invalid, the processor updates the in-memory data structure to reflect that the less than 100% of the block is used.

Figure 3:
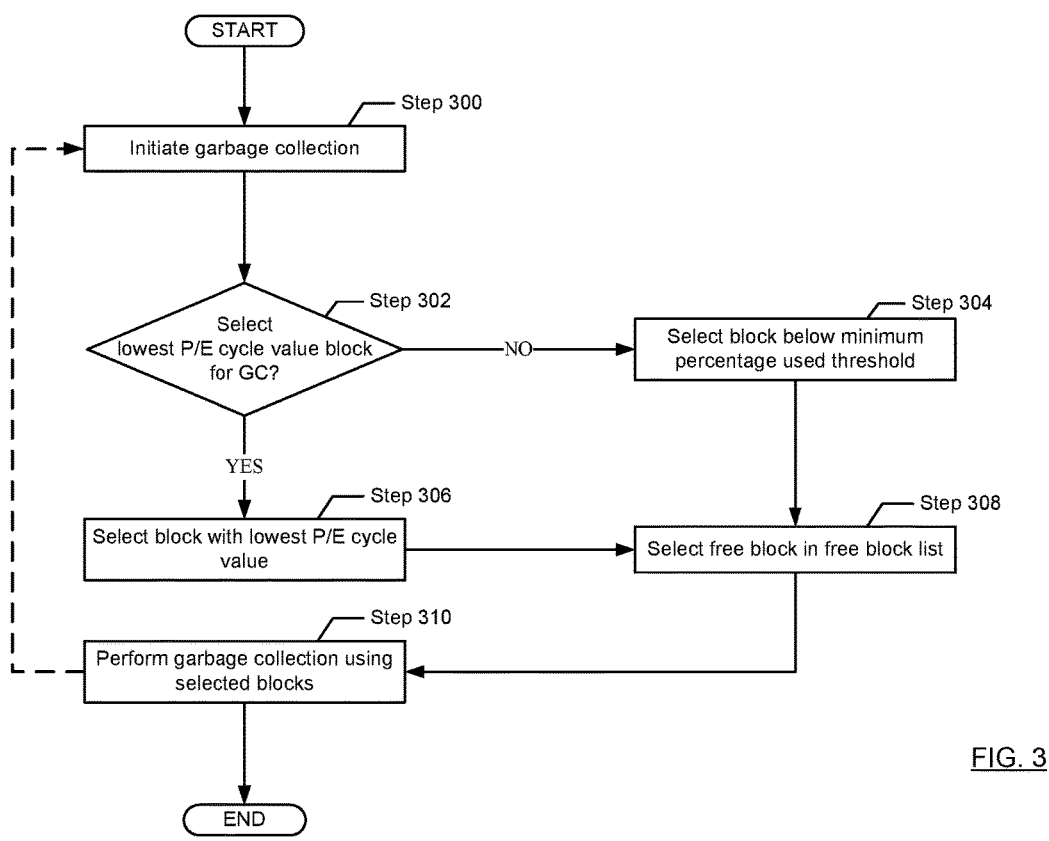
FIG. 3 shows a flowchart for performing a garbage collection operation in accordance with one or more embodiments of the technology.

Turning to FIG. 3, FIG. 3 shows a flowchart for receiving a write request in accordance with one or more embodiments of the technology.

In step 300, a determination is made to initiate the garbage collection operation in the storage appliance. The determination in step 300 may occur when the amount of available space in the solid state memory modules is below a threshold. For example, the garbage collection operation may be initiated when less than five percent of the total available space in the solid state memory modules is available to service new write requests from clients. Those skilled in the art will appreciate that the other percentages (other than five percent) may be used without departing from the technology.

Continuing with the discussion of FIG. 3, once a determination is made to initiate the garbage collection operation in step 302, a determination is made about which block to process. Said another way, once garbage collection has been initiated, a block that currently includes data (some or all of which may be invalid) must be selected. The block may be selected based at least one of the two following factors: (i) factor 1—the current P/E cycle value of the block, and (ii) factor 2—the percent (or percentage) of used space (i.e., percent of the block that is currently storing valid data).

In one embodiment of the technology, where factor 1 or factor 2 is selected as primary factor for block selection is based on the selection frequency. For example, the selection frequency may be 1/100 (or one percent). Accordingly, for every 100 blocks that are selected for garbage collection, factor 1 is used one time as the primary factor to select the block and factor 2 is used 99 times. The technology is not limited to the aforementioned selection factor. The selection frequency may be set based on the maximum desired distribution of P/E cycle values across blocks in the solid state memory modules. Continuing with the above example, if the selection frequency is one percent, then the maximum distribution of P/E cycle values across blocks in the solid state memory modules is 100 P/E cycle values. Additionally, or alternatively, the selection frequency may be set to ensure an even (or substantially even) distribution of P/E cycle values across the blocks. For example, the selection frequency may be set such that there is no more than a 3% difference in wear-level between the least worn block and the most worn block in the storage appliance (or storage module). Those skilled in the art will appreciate that the technology is not limited to the aforementioned examples.

Embodiments of the technology allow for the balancing of at least the following two factors: wear-leveling and user write performance. More specifically, if only wear-leveling is considered as a factor for selecting block for garbage collection then the performance of the storage appliance may be negatively impacted because of potentially unnecessary copying of valid data. On the other hand, if only minimum spaced used is considered as factor for selecting a block for garbage collection then the total life of the storage modules may be negatively impacted as this factor tends to select blocks which already have a lot of wear and decreases the life of these blocks out of proportion with other blocks in the storage appliance. However, by using both factors (as described below), the storage appliance may be able to achieve the benefits of more uniform wear-leveling as well as the performance benefits of continuously copying valid user data from one block to another in the storage module.

If, based on the selection frequency, the block with the lowest P/E cycle value is to be selected (i.e., factor 1 is the primary selection factor), then the process proceeds to step 306. If, based on the selection frequency, the block with a percent used below a minimum percent used threshold is to be selected (i.e., factor 2 is the primary selection factor), then the process proceeds to step 304.

In step 304, a currently used block (i.e., a block that includes data, some or all of which may be invalid) is selected from one of the solid state memory modules, where the block has the minimum percent used out of all the blocks eligible for garbage collection. The selection performed in step 304 may use the in-memory data structure (see e.g., FIG. 1, 108). The process then proceeds to step 308.

In step 306, a block with the lowest P/E cycle value is selected from one of the solid state memory modules. The selection performed in step 304 may use the in-memory data structure (see e.g., FIG. 1, 108). The process then proceeds to step 308.

In step 308, a free block (i.e., a block that has been previously erased) is selected. The free block may be selected using a free block list, where the in-memory data structure is used to track the free blocks in the solid state memory modules.

In step 310, a garbage collection operation is performed on the selected block (i.e., the block selected in step 304 or 306). The result of performing the garbage collection operation is the copying of valid data from the selected block to the free block selected in step 308. Once all the data has been copied from the selected block, the selected block is erased and the free block list is updated to include the now erased block.

Steps 302-310 may be continuously repeated after the garbage collection has been initiated in the storage appliance for some or all blocks in the storage appliance and continue until the garbage collection operation has been terminated.

Figure 4A:
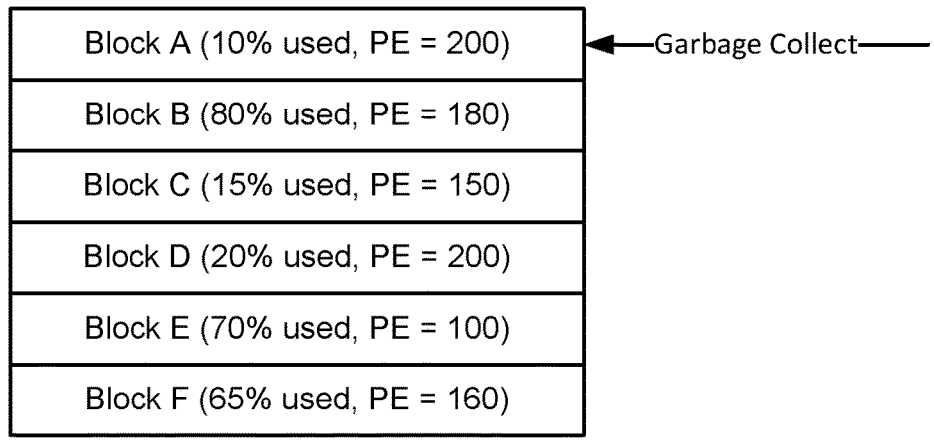
FIGS. 4A-4C show various examples in accordance with one or more embodiments of the technology.
Figure 4B:
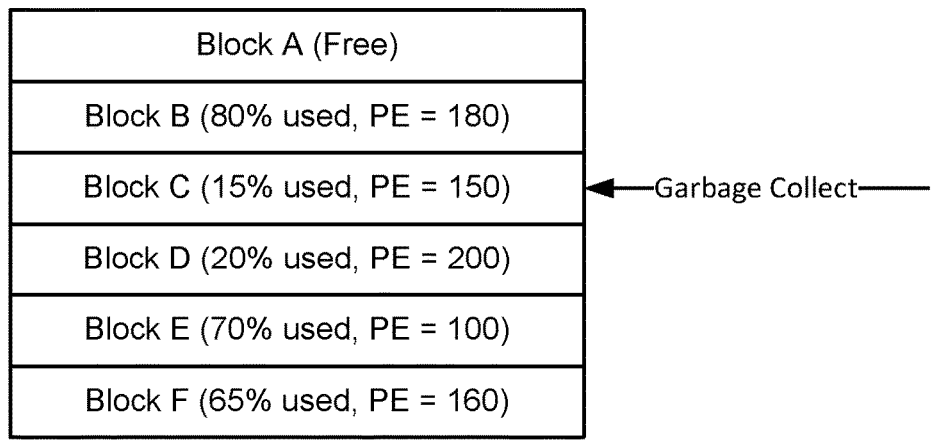
Figure 4C:
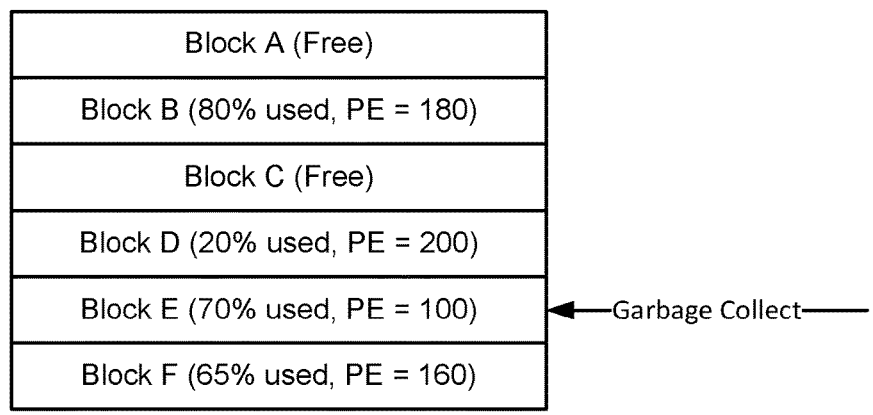

FIGS. 4A-4C show various examples in accordance with one or more embodiments of the technology. The examples are not intended to limit the scope of the technology.

Turning to 4A, consider a scenario in which garbage collection has been initiated in a solid state memory module, where the solid state memory module includes blocks A-F. Further, for purposes of this example, assume that the selection frequency is ⅓ (or 33%). Accordingly, 33% of the time, the primary factor for selecting a block for garbage collection is P/E cycle value and 66% of the time the primary factor for selecting a block for garbage collection is minimum percent used.

Based on the above selection frequency, block A, which has the lowest percent used is selected for garbage collection. Once block A has been processed, the method shown in FIG. 3 is performed again on the remaining non-processed blocks (i.e., blocks B-F). Specifically, referring to FIG. 4B, block C is subsequently selected for garbage collection as it has the lowest percent used. More specifically, based on the aforementioned selection frequency, block C is selected as the primary factor that is used selecting a block for garbage collection in minimum percent used.

Once block C has been processed, the method shown in FIG. 3 is performed again on the remaining non-processed blocks (i.e., blocks B, D-F). Specifically, referring to FIG. 4C, block E is subsequently selected for garbage collection as it has the lowest P/E cycle value. More specifically, based on the aforementioned selection frequency, block E is selected because the primary factor that is used selecting this block for garbage collection is the lowest P/E cycle value. Those skilled in the art will appreciate that block E is selected for garbage collection even though the result of garbage collection will not result in a substantial amount of space being reclaimed as part of the garbage collection process.

The aforementioned process will continue where the blocks being selected for garbage collection are based on at least one of the two aforementioned primary factors and where the frequency with which a given primary factor is used is based on a set selection frequency.

One or more embodiments of the technology may be implemented using instructions executed by one or more processors in the system. Further, such instructions may correspond to computer readable instructions that are stored on one or more non-transitory computer readable mediums.

While the technology has been described with respect to a limited number of embodiments, those skilled in the art, having benefit of this disclosure, will appreciate that other embodiments can be devised which do not depart from the scope of the technology as disclosed herein. Accordingly, the scope of the technology should be limited only by the attached claims.

What is claimed is:

1. A non-transitory computer readable medium comprising instructions, which when executed by a processor perform a method, the method comprising:
   in response to initiating garbage collection on a storage appliance that comprises a plurality of blocks:
      selecting a first block from the plurality of blocks,
         wherein a selection frequency specifies when a first factor for block selection is used as compared to when at least a second factor for block selection is used,
         wherein, based on the selection frequency, the first block is selected using the first factor for block selection;

performing a garbage collection operation on the first block to generate a first erased block in the storage appliance, selecting a second block from the plurality of blocks, wherein, based on the selection frequency, the second block is selected using the second factor for block selection; and performing the garbage collection operation on the second block to generate a second erased block in the storage appliance, wherein the first factor for block selection uses a program/erase (P/E) cycle value associated with the first block, wherein the second factor for block selection uses information about an amount of valid data stored in the second block.

2. The non-transitory computer readable medium of claim 1, the method further comprising:

obtaining the selection frequency prior to selecting the first block.

3. The non-transitory computer readable medium of claim 1, wherein the selection frequency is specified to ensure even program/erase (P/E) cycle value distribution across the plurality of blocks in the storage appliance.

4. A method for managing data, comprising:

in response to initiating garbage collection on a storage appliance that comprises a plurality of blocks:

selecting a first block from the plurality of blocks,
wherein a selection frequency specifies when a first factor for block selection is used as compared to when at least a second factor for block selection is used,
wherein, based on the selection frequency, the first block is selected using the first factor for block selection;

performing a garbage collection operation on the first block to generate a first erased block in the storage appliance, selecting a second block from the plurality of blocks, wherein, based on the selection frequency, the second block is selected using the second factor for block selection; and performing the garbage collection operation on the second block to generate a second erased block in the storage appliance, wherein the first factor for block selection uses a program/erase (P/E) cycle value associated with the first block, wherein the second factor for block selection uses information about an amount of valid data stored in the second block.

5. The method of claim 4, further comprising:

obtaining the selecting frequency prior to selecting the first block.

6. The method of claim 4, wherein selection frequency is specified to ensure an even program/erase (P/E) cycle value distribution across the plurality of blocks in the storage appliance.

7. A storage appliance, comprising:

persistent storage;

a non-transitory computer readable medium comprising instructions;

a processor, configured to execute the instructions, wherein the instructions when executed by the processor perform the method, the method comprising:

selecting a first block from the plurality of blocks,
wherein a selection frequency specifies when a first factor for block selection is used as compared to when at least a second factor for block selection is used,
wherein, based on the selection frequency, the first block is selected using the first factor for block selection;

performing a garbage collection operation on the first block to generate a first erased block in the storage appliance, selecting a second block from the plurality of blocks, wherein, based on the selection frequency, the second block is selected using the second factor for block selection; and performing the garbage collection operation on the second block to generate a second erased block in the storage appliance, wherein the first factor for block selection uses a program/erase (P/E) cycle value associated with the first block, wherein the second factor for block selection uses information about an amount of valid data stored in the second block.

8. The system of claim 7, wherein the method further comprises:

obtaining the selecting frequency prior to selecting the first block.

9. The system of claim 7, wherein selection frequency is specified to enforce a maximum program/erase (P/E) cycle value distribution across the plurality of blocks in the storage appliance.

* * * * *